United States Patent [19]
Colberg et al.

[11] Patent Number: 4,694,075
[45] Date of Patent: Sep. 15, 1987

[54] BISAZO COMPOUNDS CONTAINING ANTHRANILIC ACID AND THIAZOLE MOIETIES

[75] Inventors: Horst Colberg, Schifferstadt; Erwin Hahn, Heidelberg, both of Fed. Rep. of Germany

[73] Assignee: BASF Aktiengesellschaft, Lugwigshafen, Fed. Rep. of Germany

[21] Appl. No.: 820,018

[22] Filed: Jan. 21, 1986

[51] Int. Cl.$^4$ .................. C09B 31/14; C09B 44/08; D06P 1/04; D06P 1/41
[52] U.S. Cl. .................. 534/604; 534/589; 534/605; 534/614; 534/728; 534/756; 534/763; 534/764; 534/829; 534/688; 162/162; 8/691; 8/437; 106/22; 106/23
[58] Field of Search ........... 534/603, 604, 605, 606, 534/608, 614, 728, 756, 763, 764

[56] References Cited
U.S. PATENT DOCUMENTS 3,020,272 2/1962 Sartori .................. 534/603 X
3,694,426 9/1972 Doss .................... 534/603 X

FOREIGN PATENT DOCUMENTS 1516978 10/1975 United Kingdom ............ 534/603

Primary Examiner—Floyd D. Higel
Attorney, Agent, or Firm—Oblon, Fisher, Spivak, McClelland & Maier

[57] ABSTRACT

The compounds of the formula

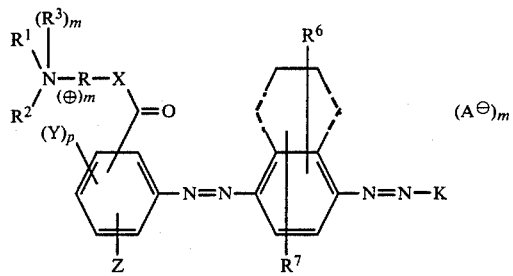

where Y is hydrogen, chlorine, bromine or nitro, Z is hydrogen, chlorine, bromine, a sulfonic ester group or unsubstituted or substituted sulfamyl, X is —O— or

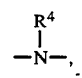

R is alkylene which may or may not be interrupted by oxygen or

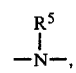

m is 0 or 1, p is 1 or 2, $R^1$ and $R^2$ independently of one another are each hydrogen, unsubstituted or substituted alkyl, alkenyl, cycloalkyl, aralkyl, or aryl, or $R^1$ and $R^2$ together with the nitrogen form a heterocyclic structure, $R^3$ is hydrogen or unsubstituted or substituted alkyl, $R^6$ and $R^7$ independently of one another are each hydrogen, unsubstituted or substituted alkyl, alkoxy or acylamino, K is a radical of a coupling component, $A^\ominus$ is an anion, $R^4$ is unsubtituted or substituted alkyl and $R^5$ is hydrogen or $C_1$–$C_4$-alkyl, and the radical

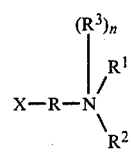

may furthermore be an unsubstituted or substituted piperazine radical, are useful for dyeing acid-modified fibers, leather and in particular paper.

13 Claims, No Drawings

BISAZO COMPOUNDS CONTAINING ANTHRANILIC ACID AND THIAZOLE MOIETIES

The present invention relates to compounds of the general formula (I)

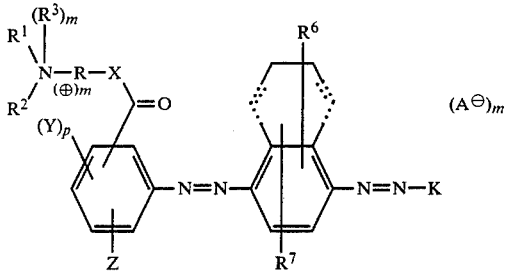

where Y is hydrogen, chlorine, bromine or nitro, Z is hydrogen, chlorine, bromine, a sulfonic ester group or unsubstituted or substituted sulfamyl, X is —O— or

R is alkylene which may or may not be interrupted by oxygen or

m is 0 or 1, p is 1 or 2, $R^1$ and $R^2$ independently of one another are each hydrogen, unsubstituted or substituted alkyl, alkenyl, cycloalkyl, aralkyl or aryl, or $R^1$ and $R^2$ together with the nitrogen form a heterocyclic structure, $R^3$ is hydrogen or unsubstituted or substituted alkyl, $R^6$ and $R^7$ independently of one another are each hydrogen, unsubstituted or substituted alkyl, alkoxy or acylamino, K is a radical of a coupling component, $A^-$ is an anion, $R^4$ is unsubstituted or substituted alkyl and $R^5$ is hydrogen or $C_1$–$C_4$-alkyl, and the radical

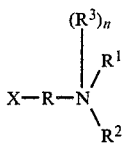

may furthermore be an unsubstituted or substituted piperazine radical.

Specific examples of radical Z in addition to those stated above are $SO_2NH_2$, $SO_2NHCH_3$, $SO_2NHC_2H_5$, $SO_2NHC_3H_7$, $SO_2NHC_4H_9$, $SO_2NHC_6H_5$, $SO_2N(CH_3)_2$, $SO_2N(C_2H_5)_2$, $SO_2N(C_3H_7)_2$, $SO_2N(C_4H_9)_2$, $SO_2NHC_2H_4OH$,

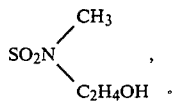

$SO_2N(C_2H_4OH)_2$, $SO_2OCH_2CH_2N(CH_3)_2$, $SO_2OC_2H_4N(C_2H_5)_2$, $SO_2OC_2H_4N(C_4H_9)_2$,

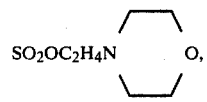

$SO_2OCH(CH_3)CH_2N(CH_3)_2$, $SO_2OCH(CH_3)CH_2N(C_2H_5)_2$, $SO_2OC_4H_8N(CH_3)_2$ or $SO_2OC_4H_8N(C_2H_5)_2$.

Z is particularly preferably hydrogen, chlorine or bromine.

Unsubstituted or substituted alkylene radicals R are of, for example 2 to 10 carbon atoms, $C_2$- and $C_3$-radicals being preferred.

Specific examples are $C_2H_4$, $C_3H_6$,

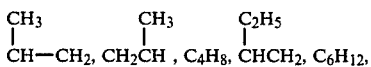

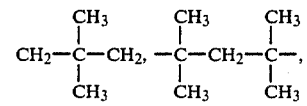

$C_2H_4OC_2H_4$, $C_3H_6OC_3H_6$, $C_3H_6OC_2H_4OC_3H_6$, $C_3H_6OC_4H_8OC_3H_6$, $C_3H_6OC_2H_4OC_2H_4OC_3H_6$, $C_2H_4NHC_2H_4$, $C_2H_4NHC_3H_6$, $C_3H_6NHC_3H_6$, $C_3H_6NHC_2H_4NHC_3H_6$, $C_3H_6NHC_6H_{12}NHC_3H_6$,

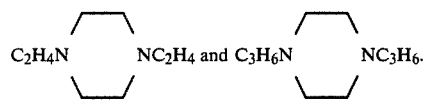

R is preferably, for example, $C_2H_4$ or $CH_2CH(CH_3)$.

As a rule, alkyl radicals $R^1$ and $R^2$ are of 1 to 14 carbon atoms and may be substituted by, for example, N-cycloalkylamino, N,N-di-$C_1$-$C_5$-alkylamino, hydroxyl or $C_1$-$C_8$-alkoxy. Other examples are allyl, methallyl and $C_5$-$C_8$-cycloalkyl.

Specific examples of radicals in addition to those stated above are methyl, ethyl, n-propyl, isopropyl, n-butyl, isobutyl, n-amyl, isoamyl, n-hexyl, isohexyl, heptyl, octyl, 2-ethylhexyl, decyl, dodecyl, tridecyl, tetradecyl, 2-hydroxyethyl, 2- and 3-hydroxypropyl, hydroxybutyl, cyclopentyl, cyclohexyl and cyclooctyl, N,N-dimethylaminoethyl, N,N-diethylaminoethyl, N,N-dipropylaminoethyl, N,N-dibutylaminoethyl, 3-(N,N-dimethylamino)propyl, 3-(N,N-diethylamino)propyl, 3-(N,N-dipropylamino)propyl and 3-(N,N-dibutylamino)-propyl, N-cyclohexylaminoethyl 3-N-cyclohexylamino)-propyl, 3-(N-cyclooctylamino)propyl, N-methyl-N-cyclohexylaminoethyl, 3-(N-methyl-N-cyclohexylamino)-propyl, benzyl, phenethyl, phenyl and tolyl.

$R^1$ and $R^2$, together with the nitrogen, can form, for example, the radicals of the following heterocycles: pyrrolidine, piperidine, morpholine, piperazine which may be substituted at the nitrogen by methyl, ethyl, n- or isopropyl, n-, iso- or sec.-butyl, 2-hydroxyethyl, 2-aminoethyl, 2- or 3-hydroxypropyl or 2- or 3-aminopropyl, imidazole which may be substituted in 2- and/or 4-position by methyl, ethyl, propyl or butyl, or N-3-($C_1$-$C_{12}$)-alkyl or vinylimidazole which may be further substituted in the 2- and/or 4-position by methyl, ethyl, propyl or butyl.

Examples of preferred radicals $R^1$ and $R^2$ are methyl, ethyl, n-propyl, isopropyl, $C_2$- and $C_3$-hydroxyalkyl or cyclohexyl.

Preferred heterocyclic radicals

are, for example, those or morpholine, piperidine, 4-methylpiperazine, 4-ethylpiperazine, 4-hydroxyethylpiperazine, 4-(2'-aminoethyl)-piperazine, imidazole, 2-methylimidazole and 4-methylimidazole.

The radical

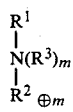

may furthermore be a group of the formula

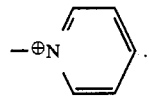

Furthermore, examples of suitable radicals $R^3$ are $C_1$–$C_{12}$-alkyl and $C_2$–$C_4$-hydroxyalkyl, such as methyl, ethyl, n- and isopropyl, n- and isobutyl, n- and isoamyl, n- and isohexyl, octyl, 2-ethylhexyl, decyl, dodecyl, 2-hydroxyethyl, 2- and 3-hydroxypropyl, hydroxybutyl, benzyl, $CH_2CH_2(OH)CH_2Cl$ and $CH_2CH(OH)CH_2OH$.

$R^3$ is preferably $C_1$–$C_4$-alkyl, $C_2$–$C_4$-hydroxy-alkyl or benzyl, particularly preferably methyl, ethyl or $C_2$- or $C_3$-hydroxyalkyl.

$R^4$ is preferably $CH_3$, $C_2H_5$ or $C_2H_4OH$.

The radicals which carry $R^6$ and $R^7$ can be unsubstituted or substituted naphthylene radicals of the formula II or phenylene radicals of the formula III.

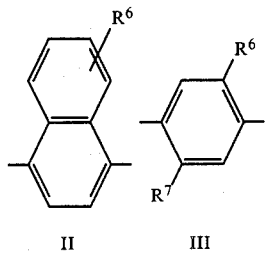

Specific examples are 1,4-naphthylene radicals which may be substituted in the 2-, 5-, 6- or 7-position by hydroxyl or $C_1$–$C_4$-alkoxy. 1,4-Naphthylene is preferred. Radicals of the formula III are, in particular, the 1,4-phenylene radicals which are monosubstituted or disubstituted by methyl, methoxy, ethoxy or acylamino, where acylamino is, for example, $NHCOCH_3$, $NHCOC_2H_5$, $NHCOC_6H_5$, $NHCONH_2$, $NHCON(CH_3)_2$ or $NHCONHC_6H_5$. $NHCOCH_3$ and $NHCONHC_6H_5$ and the combination $CH_3/OCH_3$ are particularly preferred.

Examples of suitable coupling components K are 1,3-thiazoles of the formula IV, pyrazolones of the formula V, mono- and dihydroxybenzenes, alkoxyphenols, pyridines of the formula VI or VII, anilines of the formula VIII and naphthalene derivatives of the formula IX.

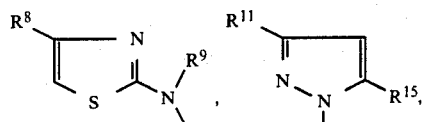

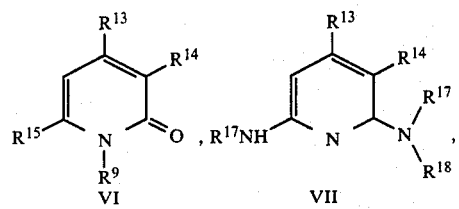

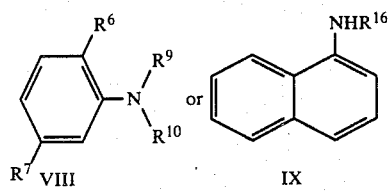

where, in the formulae, $R^8$ is hydrogen, acetyl, benzoyl, or an aliphatic, cycloaliphatic, aromatic or heterocyclic radical, $R^9$ and $R^{10}$ independently of one another are each hydrogen, unsubstituted or substituted alkyl or cycloalkyl, or together with the nitrogen form a heterocyclic structure, $R^{11}$ is hydrogen, methyl, carboxyl, $C_1$–$C_8$-alkoxycarbonyl, unsubstituted or substituted carbamyl or unsubstituted or substituted phenyl, $R^{12}$ is hydrogen, alkyl, cycloalkyl, aralkyl or unsubstituted or substituted phenyl or furyl, $R^{13}$ is hydrogen, alkyl, hydroxyl or unsubstituted or substituted amino, $R^{14}$ is hydrogen, cyano, acetyl, unsubstituted or substituted carbamyl, unsubstituted or substituted 1-pyridinium or 3-alkyl-1-imidazolium, $R^{15}$ is hydroxyl or unsubstituted or substituted amino, $R^{16}$ is hydrogen or unsubstituted or substituted alkyl or aryl and $R^{17}$ and $R^{18}$ independently of one another are each hydrogen, unsubstituted or substituted alkyl or cycloalkyl, or together with the nitrogen form a 5-membered or 6-membered heterocyclic ring, and $R^6$ and $R^7$ have the stated meanings.

$R^8$ is, for example, $C_1$–$C_4$-alkyl which is unsubstituted or substituted by chlorine, bromine, cyano, hydroxyl, $C_1$–$C_4$-alkoxy, $C_1$–$C_4$-alkoxycarbonyl, $C_1$–$C_4$-alkylmercapto, phenoxy, sulfophenoxy, phenylmercapto, amino, N-mono- or N,N-di-$C_1$–$C_4$-alkylamino, phenylamino, sulfophenylamino, $C_1$–$C_4$-alkanoylamino or sulfoethylamino, or is, for example, vinyl or cyclohexyl, or is, for example, thienyl, thiazolyl or phenyl which is unsubstituted or substituted by fluorine, chlorine, bromine, hydroxyl, $C_1$–$C_4$-alkoxy, $\beta$-$C_1$–$C_4$-alkanoyloxyethoxy, $\beta$-cyanoethoxy, $\beta$-carboxyethoxy, $\beta$-$C_1$–$C_4$-alkoxycarbonylethoxy, phenoxy, sulfophenoxy, $C_1$–$C_4$-alkylmercapto, phenylmercapto, amino, $\beta$-$C_1$–$C_4$-alkanoylamino, benzoylamino, $C_1$–$C_4$-alkylamino or dialkylamino, phenylamino, sulfophenylamino, $C_1$–$C_4$-alkylsulfonylamino or phenylsulfonylamino.

Specific examples of radicals $R^8$ are $CH_3$, $C_2H_5$, $CH_2Cl$, $CH_2CN$, $CH_2OH$, $CH_2$—$CH_2Cl$, $CH_2$—$CH$-

$_2$OH, CH$_2$—CH$_2$CN, CH$_2$—COOCH$_3$, CH$_2$COOC$_2$H$_5$, —CH$_2$OCH$_3$, —CH$_2$OC$_2$H$_5$, CH$_2$SCH$_3$, CH$_2$N(CH$_3$)$_2$, C$_6$H$_5$OCH$_2$, C$_6$H$_5$, ClC$_6$H$_4$, BrC$_6$H$_4$, FC$_6$H$_4$, Cl$_2$C$_6$H$_3$, CH$_3$C$_6$H$_4$, (CH$_3$)$_2$C$_6$H$_3$, CH$_3$OC$_6$H$_4$, C$_2$H$_5$OC$_6$H$_4$, NCC$_2$H$_4$OC$_6$H$_4$, CH$_3$OOC.C$_2$H$_4$OC$_6$H$_4$, H$_2$NCOC$_2$H$_4$OC$_6$H$_4$, CH$_3$COOC$_2$H$_4$OC$_6$H$_4$, HOC$_2$H$_4$OC$_6$H$_4$, HOC$_6$H$_4$, C$_6$H$_5$OC$_6$H$_4$, CH$_3$SC$_6$H$_4$, C$_6$H$_5$SC$_6$H$_4$, NC—C$_2$H$_4$SC$_6$H$_4$, CH$_3$CONHC$_6$H$_4$, C$_2$H$_5$CONHC$_6$H$_4$, H$_2$N—C$_6$H$_4$, HOC$_2$H$_4$NHC$_6$H$_4$, (C$_2$H$_5$)$_2$NC$_6$H$_4$, CH$_3$SO$_2$NHC$_6$H$_4$, C$_6$H$_5$SO$_2$NHC$_6$H$_4$, C$_6$H$_5$NHC$_6$H$_4$,

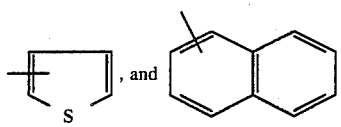

$R^8$ is preferably C$_1$–C$_4$-alkyl, β-carboxymethyl, or phenyl which is unsubstituted or substituted by chlorine, bromine, methyl, ethyl, C$_1$–C$_4$-alkoxy, β-cyanoethoxy, β-carboxyethoxy, phenoxy, sulfophenoxy, C$_1$–C$_4$-alkanoylamino, phenylamino, sulfophenylamino or sulfoethylamino.

$R^9$ and $R^{10}$ are each, for example, C$_1$–C$_8$-alkyl which may be interrupted by oxygen and substituted by hydroxyl, carboxyl, cyano, chlorine, bromine, phenyl, C$_1$–C$_8$-alkoxy, C$_1$–C$_4$-alkanoyloxy, C$_1$–C$_4$-alkoxycarbonyl, C$_1$–C$_4$-alkanoylamino, acetyl, C$_1$–C$_4$-alkylaminocarbonyloxy, arylaminocarbonyloxy, C$_1$–C$_4$-alkoxycarbonyloxy or phenoxycarbonyloxy, or are each, for example, allyl, methallyl, propargyl, cyclohexyl, phenyl-C$_1$–C$_5$-alkyl, or phenyl which is unsubstituted or substituted by fluorine, chlorine, bromine, C$_1$–C$_4$-alkoxy-carbonyl, nitro or C$^1$–C$_4$-alkanoylamino.

Specific examples of radicals $R^9$ and $R^{10}$ in addition to those stated above are hydrogen, methyl, ethyl, propyl, butyl, β-hydroxyethyl, β-methoxyethyl, γ-methoxypropyl, β-cyanoethyl, β-carbomethoxyethyl, β-carboethoxyethyl, β-ethoxycarbonylethyl, β-acetoxyethyl, γ-acetylaminopropyl, phenoxycarbonyloxyethyl, phenylaminocarbonyloxyethyl, butylaminocarbonyloxyethyl, benzyl, β-phenethyl, phenyl, sulfophenyl, disulfophenyl, acetylaminophenyl, carboxyphenyl, cyanophenyl, chlorophenyl and sulfethyl.

$R^9$ and $R^{10}$ together with the nitrogen form, for example, oligomethyleneimino which may or may not be interrupted by O, N or S, eg. pyrrolidino, piperidino, morpholino, piperazino, α-methylpiperazino, hexamethyleneimino or thiomorpholino S-dioxide.

$R^9$ and $R^{10}$ independently of one another are each preferably C$_1$–C$_8$-alkyl, C$_2$–C$_8$-alkyl which is substituted by hydroxyl, carboxyl, hydroxysulfonyl, cyano, phenyl, C$_1$–C$_8$-alkoxy, phenoxy, C$_1$–C$_4$-alkanoyloxy, C$_1$–C$_4$-alkoxycarbonyl, C$_1$–C$_4$-alkanoylamino or C$_1$–C$_4$-alkoxycarbonyloxy, or allyl or phenyl-C$_1$–C$_5$-alkyl, or phenyl which is unsubstituted or substituted by chlorine, bromine, C$_1$–C$_4$-alkyl, C$_1$–C$_4$-alkoxy, cyano or carbamyl, and NR$^9$R$^{10}$ is preferably pyrrolidino, piperidino, piperazino or morpholino.

Examples of radicals $R^{11}$ in addition to those stated above are CONH$_2$, CONHCH$_3$, CONHC$_2$H$_5$, CONHC$_3$H$_7$, CONHC$_4$H$_9$, CON(CH$_3$)$_2$, CON(C$_2$H$_5$)$_2$, COOCH$_3$, COOC$_2$H$_5$, COOC$_3$H$_7$, COOC$_4$H$_9$, COOC$_8$H$_{17}$ and COOC$_2$H$_4$OH.

$R^{11}$ is preferably CH$_3$ or phenyl.

$R^{12}$ is, for example, C$_1$–C$_8$-alkyl, cyclohexyl, benzyl, furyl or unsubstituted or substituted phenyl. Specific examples of radicals are methyl, ethyl, n-propyl, isopropyl, n-butyl, sec.-butyl and phenyl. The phenyl radical may be substituted, for example, as follows: 2-Cl, 3-Cl, 4-Cl, 2-CH$_3$, 3-CH$_3$, 4-CH$_3$, 2-C$_2$H$_5$, 4-NO$_2$, 3-NO$_2$, 3-SO$_2$NH$_2$, 4-SO$_2$NH$_2$, 2-CN, 3-CN, 4-CN, 2-Cl, or 6-CH$_3$.

Where $R^{15}$ is OH, $R^{12}$ is preferably phenyl which is substituted by methyl, ethyl, methoxy, ethoxy, chlorine or bromine, and, where $R^{15}$ is NH$_2$, $R^{12}$ is preferably hydrogen, furyl, benzyl, cyclohexyl, C$_1$–C$_6$-alkyl or phenyl.

In addition to hydrogen, $R^{13}$ is, for example, ethyl, n- or isopropyl, butyl, pentyl, α-ethylphenyl, phenyl, methylphenyl or, preferably, methyl.

$R^{14}$ is preferably cyano.

$R^{16}$ is, for example, hydrogen, phenyl, 2-methylphenyl, 4-methylphenyl, 4-ethoxyphenyl, 2-ethylhex-1-yl, cyclohexyl, acetonylcarbonyl, methyl, ethyl, n- or isopropyl, preferably hydrogen, methyl, ethyl, phenyl or 4-methylphenyl.

The radicals $R^{17}$ and $R^{18}$ may be identical or different.

Examples of suitable radicals $R^{17}$ and $R^{18}$, in addition to hydrogen, are the following substituents: alkyl of 1 to 8 carbon atoms, C$_2$–C$_6$-alkyl which is unsubstituted or substituted by hydroxyl, cyano, alkoxy of 1 to 8 carbon atoms, phenoxy, phenoxyethoxy or benzyloxy, and cyclohexyl, norbornyl, benzyl, phenylethyl, phenylhydroxyethyl, phenylpropyl and phenylbutyl, and polyalkoxyalkyl, hydroxypolyalkoxyalkyl, alkanoyloxyalkyl, alkoxycarbonylalkyl or phenyl which is unsubstituted or substituted by chlorine, methyl, methoxy or ethoxy, and alkanoyl, aralkanoyl, aroyl, alkylsulfonyl or arylsulfonyl.

Specific examples of suitable radicals $R^{17}$ and $R^{18}$ in addition to those mentioned above are:

1. unsubstituted or-substituted alkyl: CH$_3$, C$_2$H$_5$, n- or i-C$_3$H$_7$, n- or i-C$_4$H$_9$, C$_6$H$_{13}$,

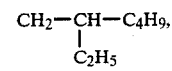

CH$_2$CH$_2$OH, (CH$_2$)$_3$OH,

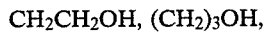

(CH$_2$)$_4$OH, (CH$_2$)$_6$OH,

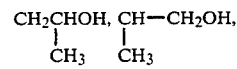

(CH$_2$)$_2$O(CH$_2$)$_2$OH, (CH$_2$)$_3$O(CH$_2$)$_4$OH, (CH$_2$)$_3$OC$_2$H$_4$OH, (CH$_2$)$_2$CN, (CH$_2$)$_5$CN, (CH$_2$)$_6$CN, (CH$_2$)$_7$CN, (CH$_2$)$_2$O(CH$_2$)$_2$CN, (CH$_2$)$_3$O(CH$_2$)$_2$CN, (CH$_2$)$_2$O(CH$_2$)$_2$O(CH$_2$)$_2$CN, (CH$_2$)$_3$OC$_2$H$_4$OCH$_3$, (CH$_2$)$_3$OC$_2$H$_4$OC$_2$H$_5$, (CH$_2$)$_3$O(CH$_2$)$_6$OH, (CH$_2$)$_3$OC$_2$H$_4$OCH(CH$_3$)$_2$, (CH$_2$)$_3$OC$_2$H$_4$OC$_4$H$_9$,

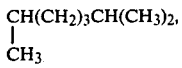

$(CH_2)_3OC_2H_4OCH_2C_6H_5$, $(CH_2)_3OC_2H_4OC_2H_4C_6H_5$,

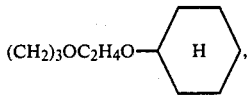

$(CH_2)_3OC_2H_4OC_6H_5$,

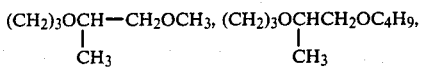

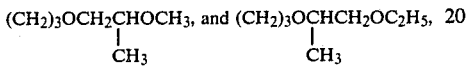

and the corresponding radicals in which two or three of the groups —$OC_2H_4$,

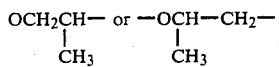

are present;

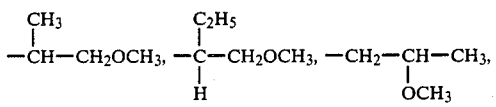

$CH_2CH_2OCH_3$, $CH_2CH_2OC_2H_5$, $CH_2CH_2OC_3H_7$, $CH_2CH_2OC_4H_9$, $CH_2CH_2OC_6H_5$, $(CH_2)_3OCH_3$, $(CH_2)_3OC_2H_5$, $(CH_2)_3OC_3H_7$, $(CH_2)_3OC_4H_9$,

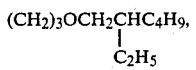

$(CH_2)_3OC_8H_{17}$, $(CH_2)_3OC_6H_{11}$, $(CH_2)_3OCH_2C_6H_5$, $(CH_2)_3OC_2H_4C_6H_5$, $(CH_2)_3OC_6H_5$,

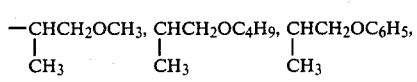

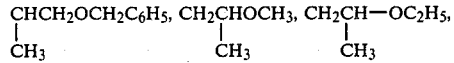

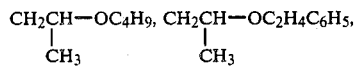

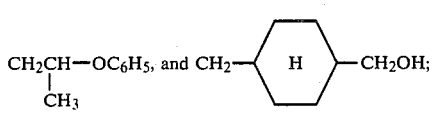

2. unsubstituted or substituted cyclo- and polycycloalkyl:

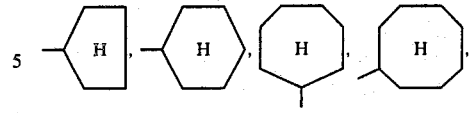

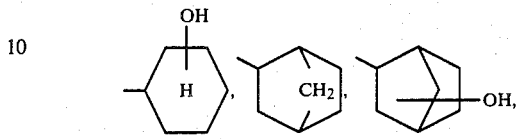

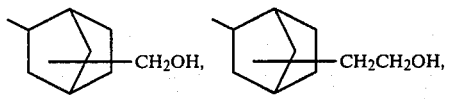

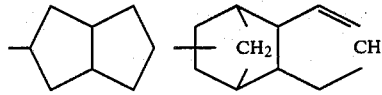

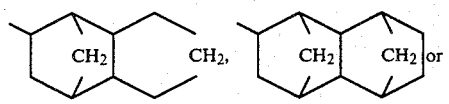

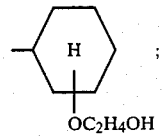

3. aralkyl:

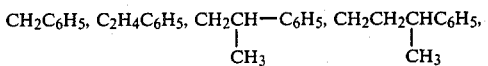

$CH_2CH—C_6H_5$ or $C_6H_4CH_3$ instead of $C_6H_5$,
  |
  OH

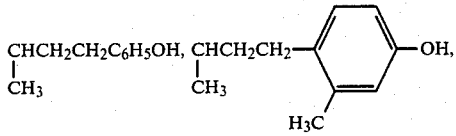

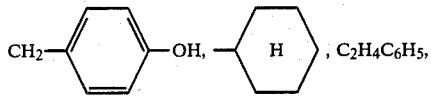

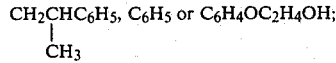

4. unsubstituted or substituted phenyl: $C_6H_5$, $C_6H_4CH_3$, $C_6H_3(CH_3)_2$, $C_6H_4OCH_3$, $C_6H_4OC_2H_5$, $C_6H_4OCH_2CH_2OH$ or $C_6H_4Cl$;

5. $CH_2CH=CH_2$, $(CH_2)_5COOCH_3$,

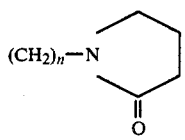

where n is 2, 3, 4 or 6, $C_2H_4OCOCH_3$, $C_2H_4OCHO$, $C_2H_4OCOCH_3$, $(C_2H_4O)_2COCH_3$, $(C_2H_4O)_2CHO$, and $(CH_2)_3OCOCH_3$, $(CH_2)_3OCHO$;

6. $CHO$, $CH_3CO$, $C_2H_4CO$, $C_3H_7CO$,

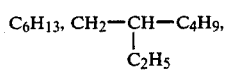

$C_2H_5CO$, $CH_3C_6H_4CO$, $C_6H_5CH_2CO$, $C_6H_5OCH_2CO$, $CH_3SO_2$, $C_2H_5SO_2$, $C_6H_5SO_2$ or $CH_3C_6H_4SO_2$.

Examples of preferred substituents $R^{17}$ and $R^{18}$ are hydrogen, $CH_3$, $C_2H_5$, n- or i-$C_3H_7$, n- or i-$C_4H_9$,

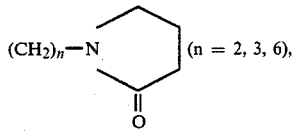

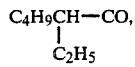

$CH_2CH_2OCH_3$, $CH_2CH_2OC_2H_5$, $CH_2CH_2OC_4H_9$,
$(CH_2)_3OCH_3$, $(CH_2)_3OC_2H_5$, $(CH_2)_3OC_3H_7$,
$(CH_2)_3OC_4H_9$,

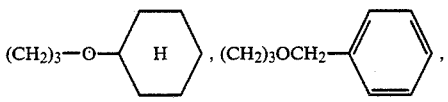

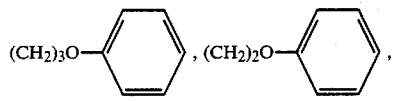

$(CH_2)_3OC_2H_4OCH_3$, $(CH_2)_3OC_2H_4OC_4H_9$,
$(CH_2)_3OC_2H_4OC_6H_5$,

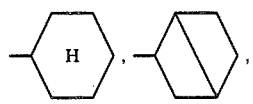

$CH_2C_6H_5$, $C_2H_4C_6H_5$, and

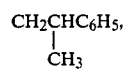

$C_6H_5$, $C_6H_4CH_3$, $C_6H_4OCH_3$.

Examples of anions are chloride, bromide, hydrogen sulfate, sulfate, nitrate, phosphate, hydrogenphosphate, dihydrogen phosphate, carbonate, bicarbonate, tetrachlorozincate, aminosulfonate, methylsulfonate, methylsulfate, ethylsulfate, formate, acetate, hydroxyacetate, aminoacetate, methoxyacetate, propionate, lactate, maleate, malonae, citrate, benzoate, phthalate, benzenesulfonate, toluenesulfonate, oleate and dodecylbenzenesulfonate.

The compounds of the formula I can be prepared by diazotizing an amino compound of the formula

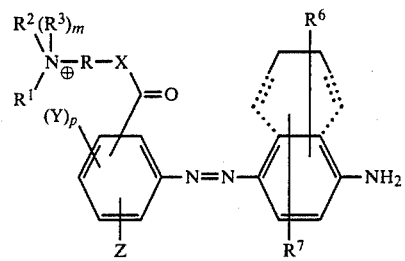

and reacting the product with a coupling component of the formula

H—K.

The Examples which follow illustrate the preparation. Parts and percentages are by weight, unless stated otherwise.

The compounds of the formula I are useful for dyeing acid-modified fibers, such as polyacrylonitrile or polyesters, leather and in particular paper. In particular, paper can moreover be printed with printing inks which contain aqueous acidic solutions of I. In the form of bases or salts with fairly long-chain carboxylic or sulfonic acids, such as oleic acid or dodecylbenzenesulfonic acid, they are also suitable, for example, for pastes for ball point pens, solvent dyes or non-aqueous printing inks. With appropriate anions, the dyes are furthermore readily soluble in water and organic solvents, so that they are useful for the preparation of liquid concentrates.

Of particular importance are compounds of the formula (Ia) and (Ib)

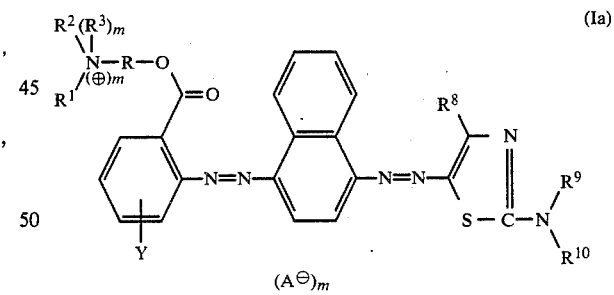

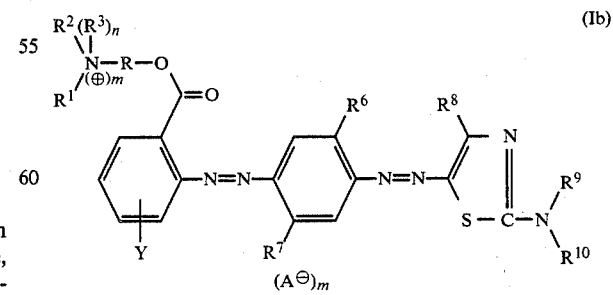

where Y, $A^\ominus$, m, R to $R^3$ and $R^6$ to $R^{10}$ have the stated meanings. Y is preferably hydrogen or nitro, R is preferably $C_2H_4$, $C_3H_6$, —$CH(CH_3)CH_2$ or $C_4H_8$, $R^1$ and $R^2$ are each preferably H, CH₃, C₂H₅, n-, i-C₃H₇, n-, i-, sec.-C₄H₉, C₂H₄OCH₃,

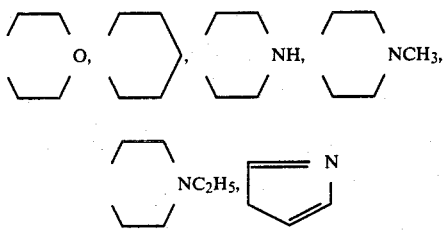

or cyclohexyl, $R^3$ is CH₃, C₂H₅ or C₂H₄OH, and $R^6$ and $R^7$ are each preferably H, CH₃ OCH₃ or OC₂H₅.

$R^8$ is preferably C₁-C₄-alkyl or β-carboxymethyl or is preferably phenyl which is unsubstituted or substituted by chlorine, bromine, methyl, ethyl, C₁-C₄-alkoxy, β-cyanoethoxy, β-carboxyethoxy, phenoxy, sulfophenoxy, C₁-C₄-alkanoylamino, phenylamino, sulfophenylamino or sulfoethylamino. Phenyl is particularly preferred.

$R^9$ and $R^{10}$ independently of one another are each preferably C₁-C₈-alkyl, or C₂-C₈-alkyl which is substituted by hydroxyl, carboxyl, hydroxysulfonyl, cyano, phenyl, C₁-C₈-alkoxy, phenoxy, C₁-C₄-alkanoyloxy, C₁-C₄-alkoxycarbonyl, C₁-C₄-alkanoylamino or C₁-C₄-alkoxycarbonyloxy, or are each preferably allyl, phenyl-C₁-C₅-alkyl, or are each preferably phenyl which is unsubstituted or substituted by chlorine, bromine, C₁-C₄-alkyl, C₁-C₄-alkoxy, cyano or carbamyl and $NR^9R^{10}$ is preferably oligomethyleneimino which may or may not be interrupted by O or N. $R^9$ and $R^{10}$ are each particularly preferably hydrogen, phenyl, methyl, ethyl or propyl, and $NR^9R^{10}$ is particularly preferably morpholino, piperazino or piperidino.

EXAMPLES

Example 1

208 parts of 2'-dimethylaminoethyl anthranilate are stirred with 500 parts of ice. 500 parts of concentrated hydrochloric acid are added, with external cooling, followed by the addition of 300 parts by volume of 23 percent strength aqueous sodium nitrite solution at below 5° C. The mixture is stirred for three hours at 10°–15° C., excess nitrite is destroyed by adding amidosulfonic acid, and a solution of 129 parts of 1-naphthylamine in 250 parts of glacial acetic acid is then added dropwise. The mixture is allowed to reach room temperature overnight, and the product is filtered off under suction and washed with 20 percent strength sodium chloride solution. The filter cake is stirred with 500 parts of ice and 200 parts of concentrated hydrochloric acid. 300 parts by volume of 23 percent strength aqueous sodium nitrite solution are added dropwise, the pH being kept below 1 by adding hydrochloric acid. Stirring is continued for one hour at room temperature, excess nitrite is destroyed, and a solution of 250 parts of 2-diethylamino-4-phenyl-1,3-thiazole in 200 parts of glacial acetic acid is then added dropwise. The pH is brought to about 4.5 by adding sodium acetate, and stirring is continued for two hours, after which the product is filtered off under suction and washed with 20 percent strength aqueous sodium chloride solution, the filter cake is stirred in ammonia water and the product is again filtered off under suction and washed with water. Freeze drying gives 1203 g of the dye of the formula

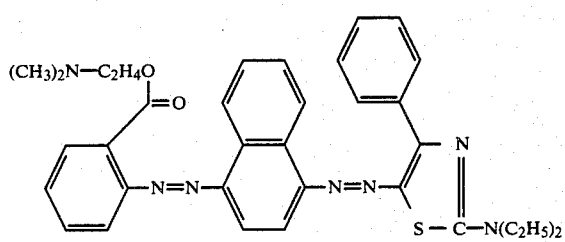

which is contaminated with salt. Melting point: 75° C.; λmax (50 percent strength acetic acid)=584.

The dye can be dissolved in glacial acetic acid and water to give a liquid formulation. It dyes paper stock intense blue in hue No. 13 (Color Index Hue Indication Chart). The waste water is colorless. The colored paper can be bleached with hypochlorite. The fastness to bleeding in aqueous sodium carbonate solution and water is excellent, even in deep hues, and that in aqueous acetic acid is very good.

Other dyes which substantially correspond to the above compound in hue and affinity for paper stock can be prepared by a method similar to that described above.

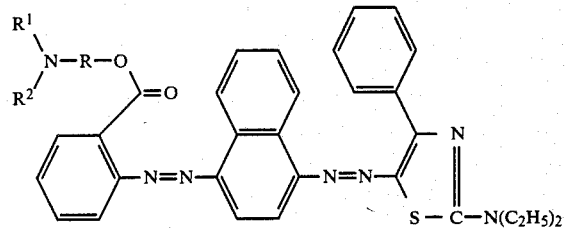

| Example No. | —R—NR¹R² |
|---|---|
| 2 | —C₂H₄N(CH₃)₂ |
| 3 | —C₂H₄N(C₂H₅)₂ |
| 4 | —C₂H₄N(C₃H₇)₂ |
| 5 | —C₂H₄N(CH(CH₃)₂)₂ |
| 6 | —C₂H₄N(C₄H₉)₂ |
| 7 | —C₂H₄N(CH₂CH(CH₃)—CH₃)₂ |
| 8 | —C₂H₄N(CH(CH₃)—C₂H₅)₂ |
| 9 | —C₂H₄NHCH₃ |
| 10 | —C₂H₄NHC₂H₅ |
| 11 | —C₂H₄N (CH₂)₅ |
| 12 | —C₂H₄N (CH₂)₆ |
| 13 | 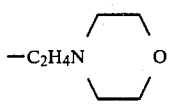 |

-continued
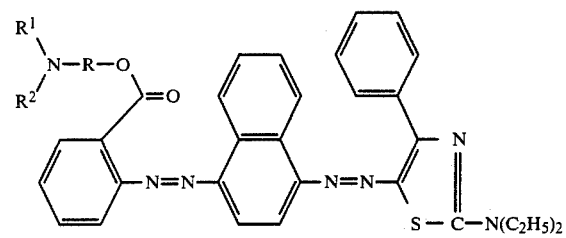
| Example No. | $-R-NR^1R^2$ |
|---|---|
| 14 | 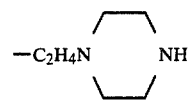 |
| 15 | 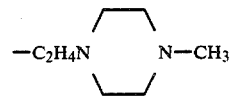 |
| 16 | 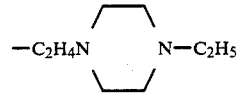 |
| 17 | 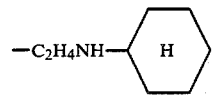 |
| 18 | 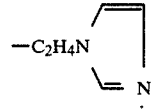 |
| 19 | $-C_2H_4N(C_2H_4OCH_3)_2$ |
| 20 | $-C_2H_4N(C_2H_4OC_2H_5)_2$ |
| 21 | 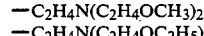 |
| 22 | 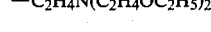 |
| 23 | 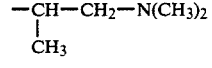 |
| 24 | 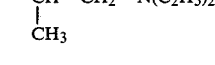 |
| 25 | 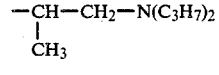 |
| 26 | 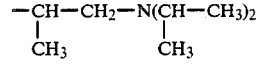 |
| 27 | 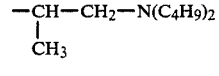 |
| 28 | 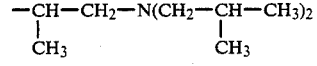 |
-continued
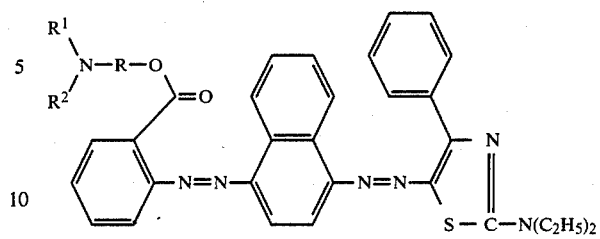
| Example No. | $-R-NR^1R^2$ |
|---|---|
| 29 | 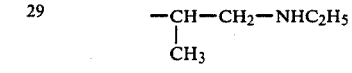 |
| 30 | 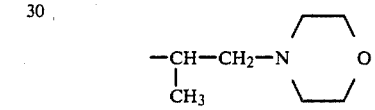 |
| 31 | 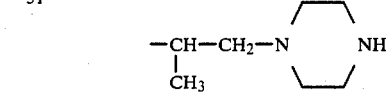 |
| 32 | 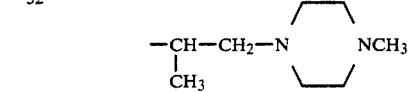 |
| 33 | 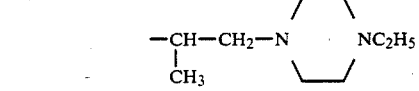 |
| 34 | 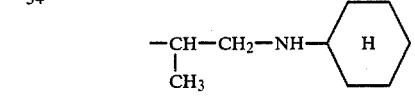 |
| 35 | 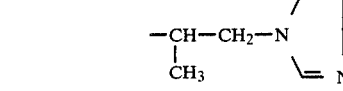 |
| 36 | 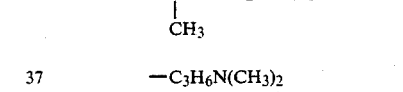 |
| 37 | $-C_3H_6N(CH_3)_2$ |
| 38 | $-C_3H_6N(C_2H_5)_2$ |
| 39 | 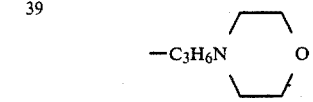 |
| 40 | 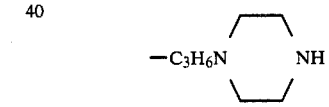 |
| 41 | 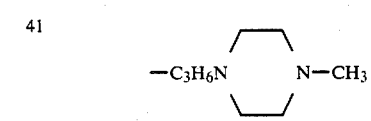 |

-continued

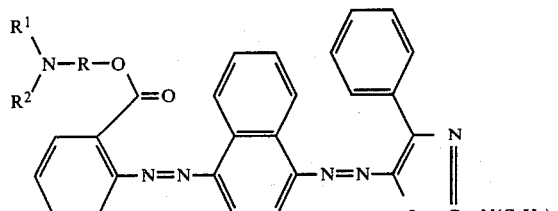

| Example No. | —R—NR¹R² |
|---|---|
| 42 | —CH₂CH(C₂H₅)—N(CH₃)₂ |
| 43 | —CH₂CH(C₂H₅)—N(C₂H₅)₂ |
| 44 | —CH₂CH(C₂H₅)—N(C₃H₇)₂ |
| 45 | —CH₂CH(C₂H₅)—N(morpholino) |
| 46 | —CH₂CH(C₂H₅)—N(piperazino-NH) |
| 47 | —CH₂CH(C₂H₅)—N(piperazino-NCH₃) |
| 48 | —C₄H₈—N(CH₃)₂ |
| 49 | —C₄H₈—N(C₂H₅)₂ |
| 50 | —C₄H₈—N(C₃H₇)₂ |
| 51 | —C₄H₈—N(morpholino) |
| 52 | —C₄H₈—N(piperazino-NH) |
| 53 | —C₄H₈—N(piperazino-NCH₃) |

Other dyes which dye paper blue can be prepared from the corresponding halogenated or sulfochlorinated derivatives of isatoic anhydride by a method similar to that described in Example 1.

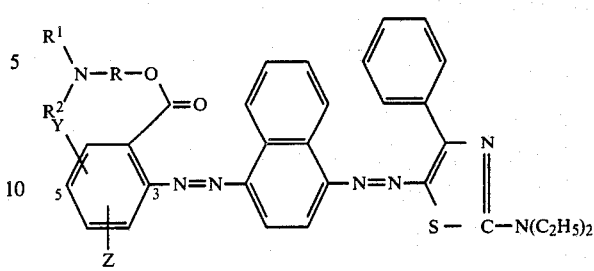

| Example No. | COOR—NR¹R² | Y | Z |
|---|---|---|---|
| 54 | COOC₂H₄N(CH₃)₂ | 5-Cl | H |
| 55 | COOC₂H₄N(morpholino) | 5-Cl | H |
| 56 | COOC₂H₄N(CH₃)₂ | 5-Br | H |
| 57 | COOC₂H₄N(morpholino) | 5-Br | H |
| 58 | COOC₂H₄N(CH₃)₂ | 3-Cl | 5-Br |
| 59 | COOC₂H₄N(CH₃)₂ | 5-Br | 3-Cl |
| 60 | COOC₂H₄N(CH₃)₂ | H | 5-SO₂OC₂H₄N(CH₃)₂ |

EXAMPLE 61

The diazo component prepared according to Example 1 is distilled. 13 parts of dimethyl sulfate are added dropwise, at 60° C., to 21 parts of the distilled diazo component in 100 parts of toluene, stirring is continued for one hour at this temperature, the mixture is cooled to room temperature and the precipitate is filtered off under suction. When the product has been dried, the diazotization equivalent is 355 g/equivalent (theory: 334 g/equivalent). The compound is of the formula

After diazotization and coupling similarly to Example 1, the solution is rendered alkaline with sodium hydroxide solution, the aqueous phase is decanted from the greasy dye, and the latter is dissolved in aqueous glacial acetic acid. The dye dyes paper stock blue and produces moderate coloration of the waste water. It is of the formula

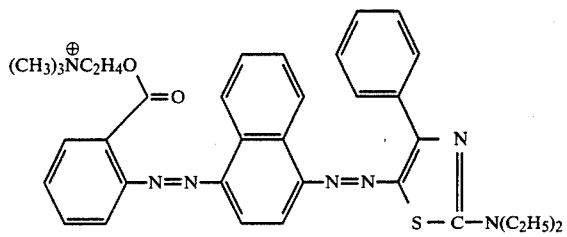

EXAMPLE 62

21 parts of 2'-dimethylaminoethyl anthranilate are stirred with 50 parts of water and 71 parts of concentrated hydrochloric acid, while cooling with ice. Diazotization is carried out using 35 parts of 23 percent strength aqueous sodium nitrite solution, the mixture is stirred for three hours, and excess nitrite is then destroyed by adding amidosulfonic acid. A solution of 14 parts of 1-naphthylamine in 50 parts of glacial acetic acid is added dropwise, the solution is buffered at pH 3.5 with sodium acetate, and coupling is completed overnight at room temperature. The mixture is then cooled to 0°–5° C., the pH is brought to 0.7 with concentrated hydrochloric acid, diazotization is effected with 35 parts of 23 percent strength aqueous sodium nitrite solution, and the temperature is allowed to increase to 15° C. in the course of three hours. Excess nitrite is destroyed.

Coupling component: 9.8 parts of 3-methylpyrazol-5-one are dissolved in 100 parts of water and 55 parts of 2N sodium hydroxide solution, and oxyethylated fatty amine and ice are added, and precipitation is then effected slowly with 10 percent strength acetic acid.

The diazonium salt solution is run into the suspension of the coupling component, the pH is brought to 3.5 by adding sodium acetate, and the mixture is stirred overnight and filtered under suction. A moist press cake having a water content of about 20% is obtained. The dye is of the formula

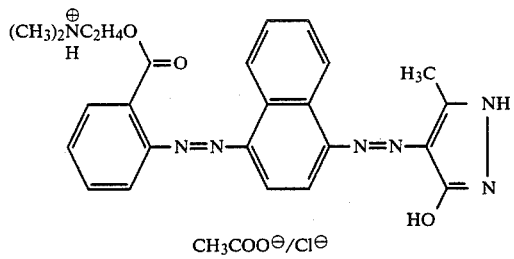

CH₃COO⊖/Cl⊖

From an acidic, aqueous solution, it dyes paper stock reddish brown in a hue between Nos. 7 and 8 (Color Index Hue Indication Chart). The waste water is virtually colorless; λmax (1:1 h₂O/glacial acetic acid)=488 nm.

The dyes below can be prepared by a method similar to that described in Example 62, using other terminal coupling components.

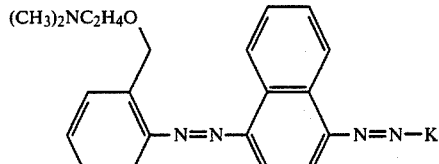

| Example | K | λ max | C.I. Hue Indication Chart |
|---|---|---|---|
| 63 | ![HO, N, phenyl, N, H3C structure] | 487 | 7–8 |
| 64 | ![HO, NH, N, phenyl structure] | 495 | 7–8 |
| 85 | ![H3C, CN, OH, N, HO structure] | 517 | 11 |
| 66 | ![OH, HO phenyl structure] |  | 35 |

Compounds having virtually the same color are obtained when the dimethylaminoethyl radical in Examples 62–66 is replaced with the radicals described in Examples 1–53 and 61.

EXAMPLE 67

21 parts of 2'-dimethylaminoethyl anthranilate in 50 parts of water and 71 parts of concentrated hydrochloric acid are stirred, while cooling with ice. Diazotization is carried out using 35 parts of 23 percent strength aqueous sodium nitrite solution, the mixture is stirred for three hours, and excess nitrite is then destroyed by adding amidosulfonic acid. A solution of 13.7 parts of 2-methoxy-5-methylaniline in glacial acetic acid is added, after which the mixture is buffered at pH 3.5 with sodium acetate and stirred overnight. The pH is brought to 0.8 by adding concentrated hydrochloric acid, and the mixture is cooled with ice and diazotized with 35 parts of 23 percent strength sodium nitrite solution for 4 hours at 5° C. Excess nitrite is destroyed, and a solution of 25 parts of 2-diethylamino-4-phenyl-1,3-thiazole and glacial acetic acid is added dropwise. The pH is brought to 3.5 with sodium acetate, and the mixture is stirred overnight and filtered under suction. The moist filter cake contains, in addition to about 30% of water and 6% of sodium chloride, the compound of the formula

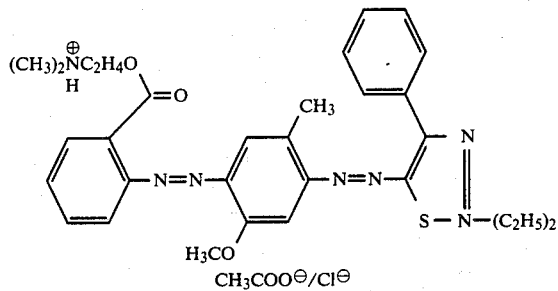

From acidic, aqueous solution, it dyes paper stock violet in hue No. 34 (C.I. Hue Indication Chart). The waste water is virtually colorless; λmax (1:1 H$_2$O/glacial acetic acid)=541 nm.

The dyes below can be prepared similarly to Example 67, using other terminal coupling components:

| Example | K | λ max |
|---------|---|-------|
| 68 | HO–[pyrazole with NH, N–CH$_3$] | 477 |
| 69 | HO–[pyrazole with NH, N–phenyl] | 484 |
| 70 | HO·–[pyrazole with N–phenyl, N–CH$_3$] | 478 |

Compounds having virtually the same color are obtained when the dimethylamino radical in Examples 67–70 are replaced with the radicals described in Examples 1–53 and 61.

EXAMPLE 71

2 parts of a 10 percent strength solution of the dye from Example 1, containing acetic acid, are added to a suspension of 50 parts of bleached sulfate pulp of about 30° SR in 2000 parts of water at pH 7. The mixture is stirred for 15 minutes at from 20° to 25° C., after which it is diluted with water to a solids content of 0.2%. This suspension is used to produce paper sheets on a laboratory sheet former, and the sheets are dried for 5 minutes at 100° C., blue sheets being obtained. The waste water is colorless, and the fastness to bleeding in water and aqueous sodium carbonate solution is excellent, while that in acetic acid is good.

When the dyes from Examples 2–70 are used, similar coloring results are obtained.

EXAMPLE 72

1.0 part of the product obtained by milling 90% of the dye from Example 1 and 10% of amidosulfonic acid is sprinkled into a stirred suspension of 100 parts of a mixture of 70% of bleached pine sulfate pulp and 30% of bleached birch sulfate pulp in 2000 parts of water, the total stock having an SR value of about 30°. The mixture is stirred for 10 minutes and diluted with water to a solids content of 0.2%, after which paper sheets are produced on a laboratory sheet former and the sheets are dried for 5 minutes at 100° C. The resulting sheets exhibit a uniform blue coloration and possess excellent fastness to bleeding in water. When products obtained by milling the dyes from Examples 2–70 with amidosulfonic acid are used, similar coloring results are obtained.

EXAMPLE 73

An absorptive web of unsized paper is drawn, at 40°–50° C., through a dye solution composed of 0.5 part of the dye from Example 1, 0.5 part of starch, 3 parts of acetic acid and 96 parts of water. The excess dye solution is pressed out between two rollers. The dried paper web is found to have been dyed blue.

The dyes from Examples 2–70 can be used in a similar manner.

We claim:

1. A compound of the formula:

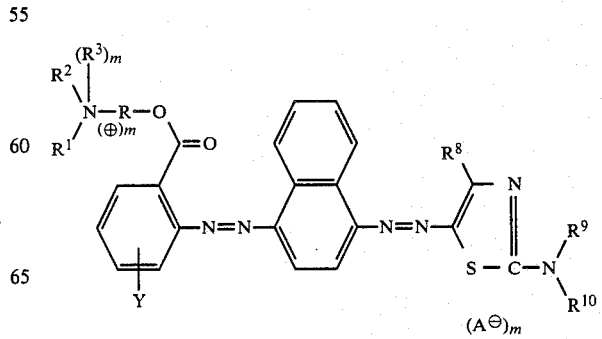

-continued

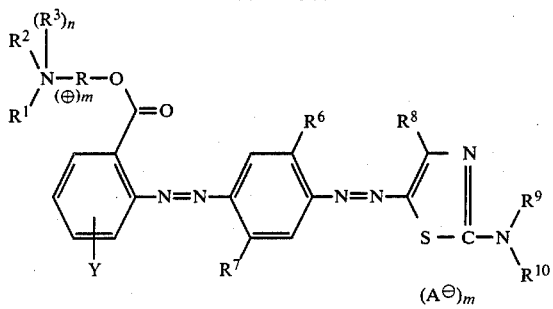

where
Y is hydrogen, chlorine, bromine or nitro;
R is $C_2H_4$, $C_3H_6$,

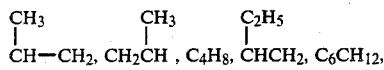
$CH-CH_2$, $CH_2CH$, $C_4H_8$, $CHCH_2$, $C_6CH_{12}$,

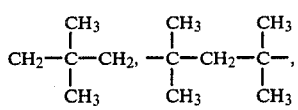

$C_2H_4OC_2H_4$, $C_3H_6OC_3H_6$, $C_3H_6OC_3H_6$,
$C_3H_6OC_4H_8OC_3H_6$, $C_3H_6OC_2H_4OC_2H_4OC_3H_6$,
$C_2H_4NHC_2H_4$, $C_2H_4NHC_3H_6$, $C_3H_6NHC_3H_6$,
$C_3H_6NHC_2H_4NHC_3H_6$, $C_3H_6NHC_6H_{12}NHC_3H_6$,

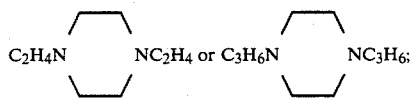

m is 0 or 1;
$R^1$ and $R^2$ independently of one another are each hydrogen, allyl, methallyl, $C_1$-$C_{14}$-alkyl, $C_1$-$C_{14}$-alkenyl, $C_5$-$C_8$-cycloalkyl, $C_1$-$C_{14}$-aralkyl, or $C_1$-$C_{14}$-aryl, unsubstituted or substituted by N-cycloalkylamino, N,N-di-$C_1$-$C_5$-alkylamino, hydroxyl or $C_1$-$C_8$-alkoxy,
or $R^1$ and $R^2$ together with the nitrogen may form pyrrolidine, piperidine, morpholine, piperazine unsubstituted or substituted at the nitrogen by methyl, ethyl, n- or isopropyl, n-, iso- or sec-butyl, 2-hydroxyethyl, 2-aminoethyl, 2- or 3-hydroxypropyl or 2- or 3-aminopropyl, imidazole unsubstituted or substituted in 2- or 4-position by methyl, ethyl, propyl or butyl, or N-3-($C_1$-$C_{12}$)-alkyl or vinylimidazole unsubstituted or substituted in the 2- or 4-position by methyl, ethyl, propyl or butyl;
$R^3$ is hydrogen, $C_1$-$C_{12}$-alkyl, or $C_2$-$C_4$-hydroxyalkyl;
$R^6$ and $R^7$ independently of one another are each hydrogen, hydroxyl, $C_1$-$C_4$-alkoxy, methyl, NHCOCH$_3$, NHCOC$_2$H$_5$, NHCOC$_6$H$_5$, NHCONH$_2$, NHCON(CH$_3$)$_2$ or NHCONHC$_6$H$_5$;
$R^8$ is hydrogen, acetyl, benzoyl, $C_1$-$C_4$-alkyl which is unsubstituted or substituted by chlorine, bromine, cyano, hydroxyl, $C_1$-$C_4$-alkoxy, $C_1$-$C_4$-alkoxycarbonyl, $C_1$-$C_4$-alkylmercapto, phenoxy, sulfophenoxy, phenylmercapto, amino, N-mono- or N,N-di-$C_1$-$C_4$-alkylamino, phenylamino, sulfophenylamino, $C_1$-$C_4$-alkanoylamino sulfoethylamino, vinyl, cyclohexyl, thienyl, thiazolyl, phenyl which is unsubstituted or substituted by fluorine, chlorine, bromine, hydroxyl, $C_1$-$C_4$-alkoxy, β-$C_1$-$C_4$-alkanoyloxyethoxy, β-cyanoethoxy, β-carboxyethyoxy, β-$C_1$-$C_4$-alkoxycarbonylethoxy, phenoxy, sulfophenoxy, $C_1$-$C_4$-alkylmercapto, phenylmercapto, amino, β-$C_1$-$C_4$-alkanoylamino, benzoylamino, $C_1$-$C_4$-alkylamino or dialkylamino, phenylamino, sulfophenylamino, $C_1$-$C_4$-alkylsulfonylamino or phenylsulfonylamino;
$R^9$ and $R^{10}$ independently of one another are each hydrogen, $C_1$-$C_8$-alkyl which is unsubstituted or substituted by hydroxyl, carboxyl, cyano, chlorine, bromine, phenyl, $C_1$-$C_8$-alkoxy, $C_1$-$C_4$-alkanoyloxy, $C_1$-$C_4$-alkoxycarbonyl, $C_1$-$C_4$-alkanoylamino, acetyl, $C_1$-$C_4$-alkylaminocarbonyloxy, arylaminocarbonyloxy, $C_1$-$C_4$-alkoxycarbonyloxy or phenoxycarbonyloxy, or are each, allyl, methallyl, propargyl, cyclohexyl, phenyl-$C_1$-$C_5$-alkyl, or phenyl which is unsubstituted or substituted by fluorine, chlorine, bromine, $C_1$-$C_4$-alkoxycarbonyl, nitro or $C_1$-$C_4$-alkanoylamino;
or $R^9$ and $R^{10}$ together with the nitrogen form pyrrolidino, piperidino, morpholino, piperazino, α-methylpiperazino, hexamethyleneimino or thiomorpholino S-dioxide; and
$A^-$ is an anion.
2. A compound according to claim 1, wherein Z is hydrogen, chlorine or bromine.
3. A compound according to claim 1, wherein R is $C_2H_4$ or $CH_2CH(CH_3)$.
4. A compound according to claim 1, wherein $R^1$ and $R^2$ are methyl, ethyl, n-propyl, isopropyl, $C_2$- and $C_3$-hydroxyalkyl or cyclohexyl.
5. A compound according to claim 1, wherein $R^1$ and $R^2$ together with the nitrogen form morpholine, piperidine, 4-methylpiperazine, 4-ethylpiperazine, 4-hydroxyethylpiperazine, 4-(2'-aminoethyl)-piperazine, imidazole, 2-methylimidazole or 4-methylimidazole.
6. A compound according to claim 1, wherein $R^3$ is $C_1$-$C_4$-alkyl, $C_2$-$C_4$-hydroxyalkyl, or benzyl.
7. A compound according to claim 1, wherein $R^3$ is methyl, ethyl or $C_2$- or $C_3$-hydroxyalkyl.
8. A compound according to claim 1, wherein $R^8$ is $C_1$-$C_4$-alkyl, β-carboxymethyl, or phenyl which is unsubstituted or substituted by chlorine, bromine, methyl, ethyl, $C_1$-$C_4$-alkoxy, β-cyanoethoxy, β-carboxyethoxy, phenoxy, sulfophenoxy, $C_1$-$C_4$-alkanoylamino, phenylamino, sulfophenylamino or sulfoethylamino.
9. A compound according to claim 1, wherein $R^9$ and $R^{10}$ independently of one another are each $C_1$-$C_8$-alkyl, $C_2$-$C_8$-alkyl which is substituted by hydroxyl, carboxyl, hydroxysulfonyl, cyano, phenyl, $C_1$-$C_8$-alkoxy, phenoxy, $C_1$-$C_4$-alkanoyloxy, $C_1$-$C_4$-alkoxycarbonyl, $C_1$-$C_4$-alkanoylamino, $C_1$-$C_4$-alkoxycarbonyloxy, allyl, phenyl-$C_1$-$C_5$-alkyl, or phenyl which is unsubstituted or substituted by chlorine, bromine, $C_1$-$C_4$-alkyl, $C_1$-$C_4$-alkoxy, cyano or carbamyl.
10. A compound according to claim 1, wherein $R^9$ and $R^{10}$ together with the nitrogen form pyrrolidino, piperidino, piperazino or morpholino.
11. A compound according to claim 1, wherein
Y is hydrogen or nitro;
R is $C_2H_4$, $C_3H_6$, —CH(CH$_3$)CH$_2$ or $C_4H_8$;
$R^1$ and $R^2$ are each H, CH$_3$, C$_2$H$_5$, n-, i-C$_3$H$_7$, n-, i-, sec-C$_4$H$_9$, C$_2$H$_4$OCH$_3$,

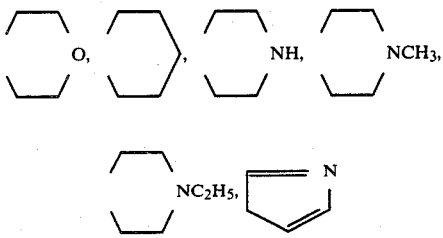

or cyclohexyl;

$R^3$ is $CH_3$, $C_2H_5$ or $C_2H_4OH$;

$R^6$ and $R^7$ are each H, $CH_3$, $OCH_3$ or $OC_2H_5$;

$R^8$ is $C_1$–$C_4$-alkyl, β-carboxymethyl or is phenyl which is unsubstituted or substituted by chlorine, bromine, methyl, ethyl, $C_1$–$C_4$-alkoxy, β-cyanoethoxy, β-carboxyethoxy, phenoxy, sulfophenoxy, $C_1$–$C_4$-alkanoylamino, phenylamino, sulfophenylamino or sulfoethylamino;

$R^9$ and $R^{10}$ independently of one another are each $C_1$–$C_8$-alkyl, or $C_2$–$C_8$-alkyl which is substituted by hydroxyl, carboxyl, hydroxysulfonyl, cyano, phenyl, $C_1$–$C_8$-alkoxy, phenoxy, $C_1$–$C_4$-alkanoyloxy, $C_1$–$C_4$-alkoxycarbonyl, $C_1$–$C_4$-alkanoylamino or $C_1$–$C_4$-alkoxycarbonyloxy, or are each allyl, phenyl-$C_1$–$C_5$-alkyl, or are each phenyl which is unsubstituted or substituted by chlorine, bromine, $C_1$–$C_4$-alkyl, $C_1$–$C_4$-alkoxy, cyano or carbamyl, and $NR^9R^{10}$ is oligomethyleneimino which may or may not be interrupted by O or N.

12. A compound according to claim 1, wherein $R^8$ is phenyl.

13. A compound according to claim 1, wherein $R^9$ and $R^{10}$ are each hydrogen, phenyl, methyl, ethyl or propyl, and $NR^9R^{10}$ is morpholino, piperazino or piperidino.

* * * * *

UNITED STATES PATENT AND TRADEMARK OFFICE
CERTIFICATE OF CORRECTION

PATENT NO. : 4,694,075

DATED : September 15, 1987

INVENTOR(S) : Horst Colberg, et al

It is certified that error appears in the above-identified patent and that said Letters Patent is hereby corrected as shown below:

Title page:

Priority Information is not printed on the Letters Patent. Should read as follows:

- January 26, 1985 [GR] Fed. Rep. of Germany ..... 3502693 -

Signed and Sealed this

Twenty-ninth Day of December, 1987

Attest:

DONALD J. QUIGG

Attesting Officer

Commissioner of Patents and Trademarks